United States Patent [19]
Brizzi et al.

[11] Patent Number: 5,617,701
[45] Date of Patent: Apr. 8, 1997

[54] SYSTEM FOR PRODUCING AND PACKING TOBACCO ITEMS, PARTICULARLY CIGARETTES

[75] Inventors: Marco Brizzi, Zola Predosa; Antonio Gamberini, Bologna, both of Italy

[73] Assignee: G.D. Societa' per Azioni, Bologna, Italy

[21] Appl. No.: 587,567

[22] Filed: Jan. 17, 1996

Related U.S. Application Data

[63] Continuation of Ser. No. 304,792, Sep. 12, 1994, abandoned.

[30] Foreign Application Priority Data

Sep. 20, 1993 [IT] Italy .................... B093A0380

[51] Int. Cl.⁶ .................................. A65B 19/02
[52] U.S. Cl. .................. 53/168; 53/148; 53/154; 53/202; 131/283; 198/347.3; 198/363
[58] Field of Search .................. 53/148, 151, 154, 53/168, 202; 198/347.1, 347.2, 347.3, 347.4, 358, 371, 362, 363, 601; 131/282, 283

[56] References Cited

U.S. PATENT DOCUMENTS

| | | | |
|---|---|---|---|
| 3,297,138 | 1/1967 | McCombie | 53/148 |
| 3,433,347 | 3/1969 | Molins et al. | 198/347.2 |
| 3,620,349 | 11/1971 | McCombie | 198/358 |
| 3,665,933 | 5/1972 | Molins et al. | 198/347.3 X |
| 4,099,608 | 7/1978 | McCombie | 198/347.3 |
| 4,120,391 | 10/1978 | Molins et al. | 198/347.3 |
| 4,147,251 | 4/1979 | Focke | 198/347.3 |
| 4,344,445 | 8/1982 | Seragnoli | 198/347.3 X |
| 4,373,624 | 2/1983 | Molins et al. | 198/347.3 |
| 4,790,422 | 12/1988 | Clarke et al. | 198/347.3 |
| 4,903,713 | 2/1990 | Clarke | 131/283 |
| 4,944,315 | 7/1990 | Focke | 131/282 X |

FOREIGN PATENT DOCUMENTS 2178715  2/1987  United Kingdom .

Primary Examiner—Daniel Moon
Attorney, Agent, or Firm—Marshall, O'Toole, Gerstein, Murray & Borun

[57] ABSTRACT

A system for producing and packing tobacco items, particularly cigarettes, wherein two packing machines are supplied with items by at least as many production machines, and wherein the outputs of the production machines are connected to one another by a conveyor channel for conveying the items and from which extend input channels connecting the conveyor channel to the individual packing machines; the items being fed along the conveyor channel by means of reversible conveyors.

5 Claims, 2 Drawing Sheets

SYSTEM FOR PRODUCING AND PACKING TOBACCO ITEMS, PARTICULARLY CIGARETTES

This is a continuation of U.S. application Ser. No. 08/304,792, filed Sep. 12, 1994, now abandoned.

BACKGROUND OF THE INVENTION

The present invention relates to a system for producing and packing tobacco items, particularly cigarettes.

More specifically, the present invention relates to a system comprising two production machines (which may be actual production machines in the case of items consisting of plain cigarettes, or filter assembly machines in the case of items consisting of filter-tipped cigarettes) and at least the same number of packing machines.

SUMMARY OF THE INVENTION

It Is an object of the present invention to provide a system of the above type wherein the items produced on each production machine may be fed to any of the packing machines.

According to the present invention, there is provided a system for producing and packing tobacco items, in particular cigarettes, comprising two packing machines for said items, and at least the same number of production machines presenting respective outputs for said items for packing; each packing machine presenting an input channel for said items; characterized in that it comprises a conveyor channel for conveying said items and connecting said outputs to one another; a junction connecting the conveyor channel to each input channel; and reversible conveyor means extending along the conveyor channel between said junctions.

The above system preferably also comprises a compensating store for each input channel.

BRIEF DESCRIPTION OF TEE DRAWINGS

A number of non-limiting embodiments of the present invention will be described by way of example with reference to the accompanying drawings, in which.

DETAILED DESCRIPTION OF THE INVENTION

Figure 1:
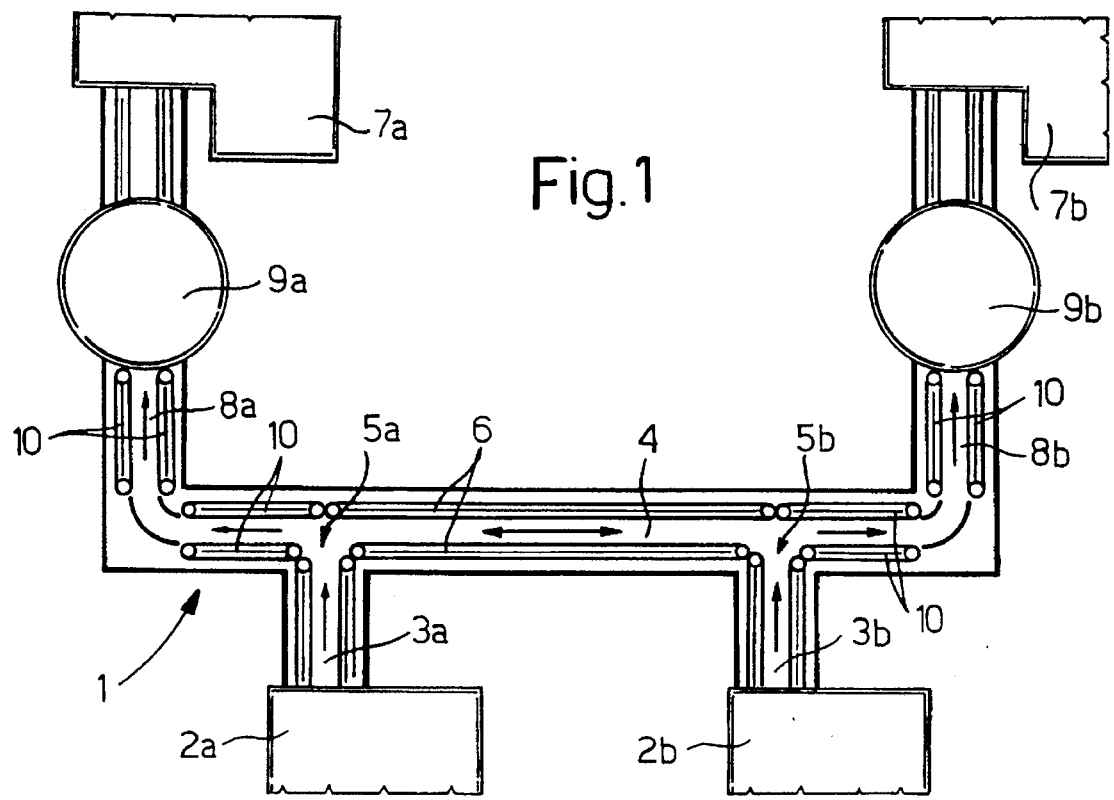
FIG. 1 shows a schematic view, with parts removed for clarity, of a first preferred embodiment of a system in accordance with the present invention.

Number 1 in FIG. 1 indicates a system for producing and packing cigarettes. System 1 comprises two production machines 2—respectively indicated 2a and 2b—presenting output conveyors 3—respectively indicated 3a and 3b—communicating with a conveyor channel 4 at junctions 5—respectively indicated 5a and 5b.

When producing plain cigarettes, production machines 2 consist of actual production machines; whereas, when producing filter-tipped cigarettes, production machines 2 consist of filter assembly machines.

Conveyor channel 4 is defined by two reversible loop conveyors 6 arranged facing each other, extending between the two junctions 5, and which provide for feeding to one or other of junctions 5 a mass (not shown) of cigarettes located between the two conveyors 6.

System 1 also comprises two packing machines 7—respectively indicated 7a and 7b—presenting input or supply channels 8—respectively indicated 8a and 8b—connected to channel 4 at respective junctions 5 and associated in known manner (not shown) with compensating stores 9—respectively indicated 9a and 9b. Each channel 8 presents a respective one-way conveyor 10 for feeding a mass (not shown) of cigarettes from respective junction 5 to respective packing machine 7.

In actual use, conveyors 6 are normally stationary, and production machines 2a and 2b respectively feed packing machines 7a and 7b. In the event, however, of machine 7a, for example, slowing down or stopping, the pressure exerted by the mass of cigarettes accumulated inside channel 8a first activates store 9a, and then conveyors 6 which withdraw the cigarettes from junction 5a between conveyor 3a and channel 4, and transfer them along channel 4 to junction 5b and from there to store 9b and packing machine 7b.

The same also applies in reverse in the event of packing machine 7b slowing down or stopping. In the event of a slowdown or stoppage of either one of production machines 2, on the other hand, conveyors 6 provide for dividing the cigarettes equally between the two packing machines 7.

In other words, reversible conveyors 6 enable each packing machine 7 to be supplied, if necessary, with at least part of the cigarettes coming off the production machine 2 directly associated with the other packing machine 7.

Figure 2:
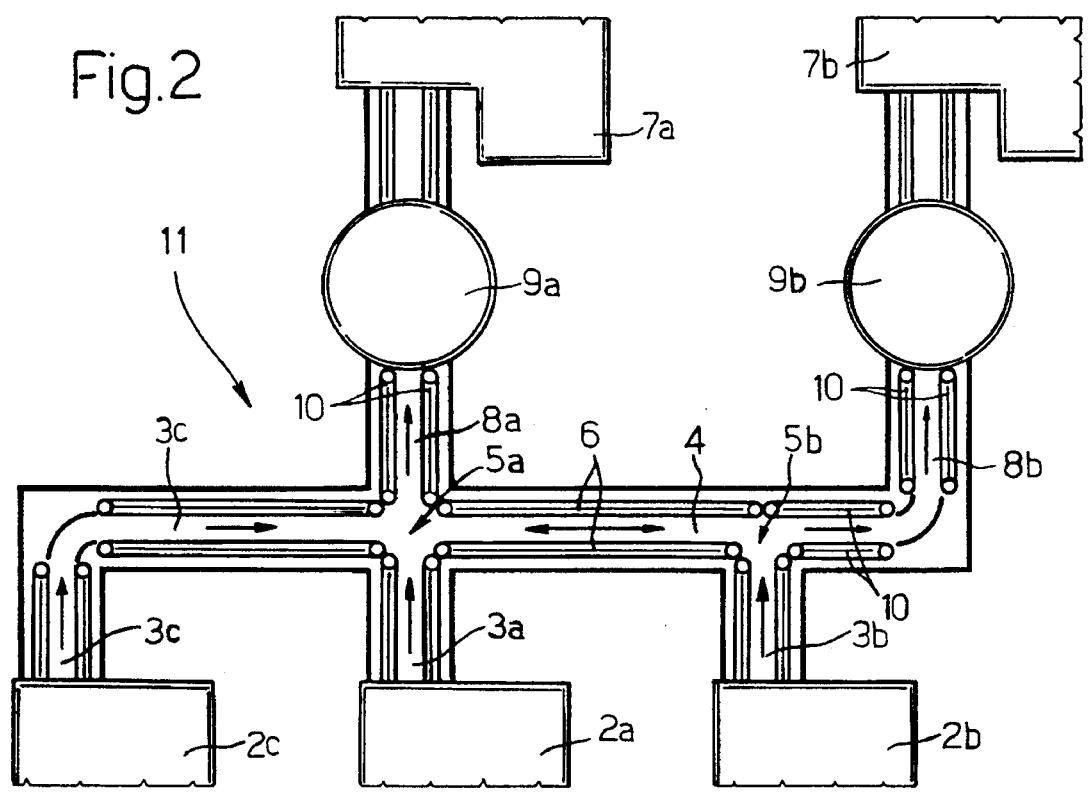
FIGS. 2 and 3 show schematic views, similar to FIG. 1, of a further two preferred embodiments of the system according to the present invention.

FIG. 2 shows a further system 11 which differs from system 1 by comprising a further production machine 2c, the output conveyor 3c of which communicates with conveyor channel 4 at one of junctions 5—in the example shown, junction 5a. As opposed to being normally stationary as in system 1, conveyors 6 of system 11 are normally operative for feeding part of the cigarettes at junction 5a to junction 5b.

Figure 3:
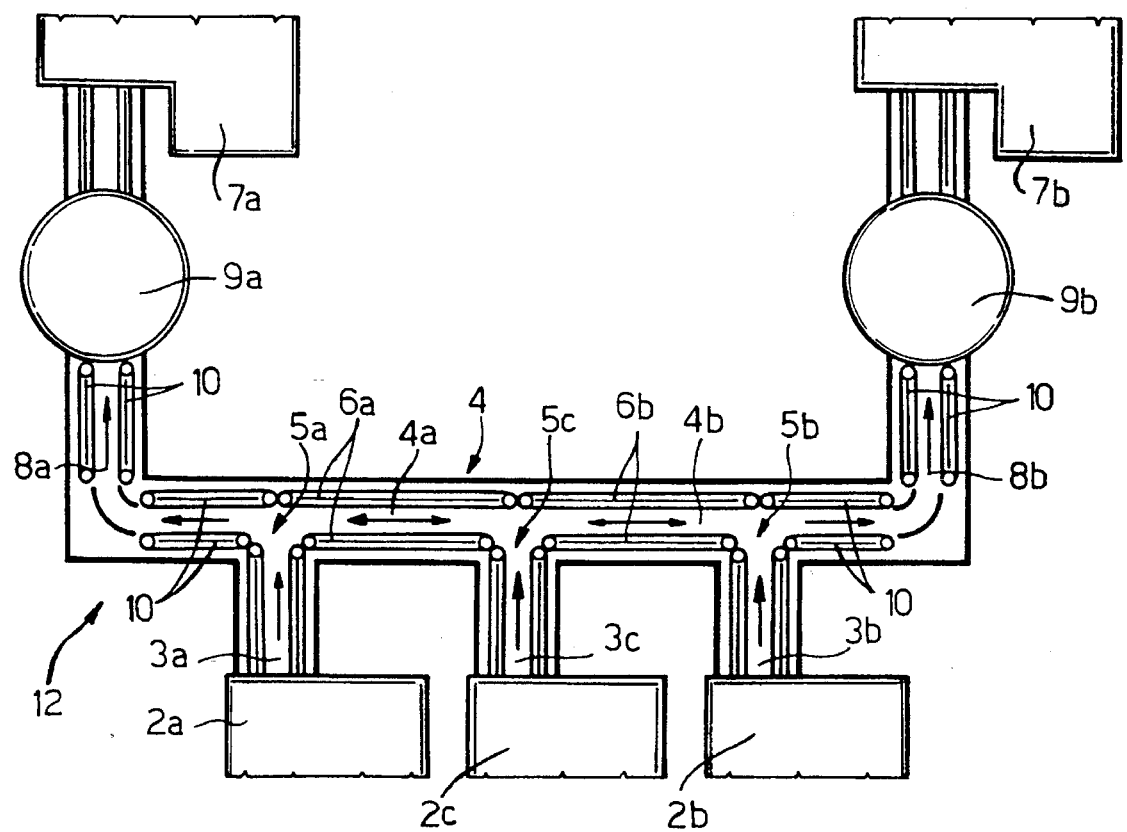

FIG. 3 shows a further system 12 which differs from system 1 by comprising a further production machine 2c located between production machines 2a and 2b, and the output conveyor 3c of which communicates with channel 4 at a further junction 5c located between junctions 5a and 5b and dividing channel 4 into two portions 4a and 4b. Also, inside channel 4 of system 12, conveyors 6 of system 1 are replaced by two pairs of reversible conveyors 6a and 6b respectively extending along portions 4a and 4b of channel 4.

Conveyors 6a and 6b of system 12 are normally operated in opposite directions for feeding the cigarettes from junction 5c to junctions 5a and 5b, but may also be stationary (e.g. in the event of stoppage of production machine 2c), or operated in the same direction (in the event of stoppage of one of the packing machines), or operated one in either direction while the other remains stationary.

We claim:

1. A system for producing and packing tobacco articles, comprising:

first and second packing machines for said articles, each packing machine having an input channel for receiving said articles;

at least first and second article making machines having respective outputs for said articles;

at least two junctions, each junction connecting a respective said input channel of said first and second packing machines to said respective outputs of said first and second article making machines for enabling the simultaneous straight delivery of said articles from said first article making machine to said first packing machine and from said second article making machine to said second packing machine;

a conveyor channel extending between said junctions and connecting said respective outputs to one another; and reversible conveyor means extending along the conveyor channel between said junctions for (1) responding to a slowing down or stopping of the first packing machine to transfer articles from the first article making machine to the second packing machine in a first cross-over delivery of the articles;

(2) responding to a slowing down or stopping of the second packing machine to transfer articles from the second article making machine to the first packing machine in a second cross-over delivery of the articles;

(3) responding to a slowing down or stopping of the first article making machine to transfer articles from the second article making machine equally between the first and second packing machines in a third cross-over delivery of the articles; and (4) responding to a slowing down or stopping of the second article making machine to transfer articles from the first article making machine equally between the first and second packing machine in a fourth cross-over delivery of the articles.

2. A system as claimed in claim 1, further including a compensating store for each input channel.

3. A system as claimed in claim 1, wherein said conveyor means includes a single reversible conveyor extending between the two junctions.

4. A system as claimed in claim 1, including three said article making machines having respective said outputs; two of said outputs communicating with a same one of said junctions.

5. A system as claimed in claim 1, including three said article making machines having respective said outputs, and a further junction arranged between said two junctions; two of said outputs being each connected to a respective one of said two junctions; a third of said outputs being connected to said further junction; and said conveyor means including two reversible conveyors, each extending between said further junction and a respective one of said two junctions.

\* \* \* \* \*